(12) United States Patent
Maeng

(10) Patent No.: US 11,414,095 B2
(45) Date of Patent: Aug. 16, 2022

(54) METHOD FOR CONTROLLING VEHICLE AND INTELLIGENT COMPUTING DEVICE FOR CONTROLLING VEHICLE

(71) Applicant: LG Electronics Inc., Seoul (KR)

(72) Inventor: Jichan Maeng, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 16/692,660

(22) Filed: Nov. 22, 2019

(65) Prior Publication Data

US 2020/0086891 A1  Mar. 19, 2020

(30) Foreign Application Priority Data

Aug. 31, 2019  (KR) .................. 10-2019-0107827

(51) Int. Cl.
```
B60W 50/14      (2020.01)
G06K 9/00       (2022.01)
B60W 40/08      (2012.01)
G06F 3/14       (2006.01)
B60W 50/00      (2006.01)
G06V 20/59      (2022.01)
G06V 40/16      (2022.01)
```

(52) U.S. Cl.
CPC ............ *B60W 50/14* (2013.01); *B60W 40/08* (2013.01); *G06F 3/1423* (2013.01); *G06V 20/597* (2022.01); *G06V 40/161* (2022.01); *B60W 2040/0827* (2013.01); *B60W 2050/0071* (2013.01); *B60W 2050/146* (2013.01); *B60W 2540/26* (2013.01)

(58) Field of Classification Search
CPC . B60W 2040/0827; B60W 2050/0071; B60W 2050/146; B60W 2540/26; B60W 40/08; B60W 50/14; G06K 9/00228; G06K 9/00604; G06K 9/00845; G06F 3/1423
See application file for complete search history.

(56) References Cited

U.S. PATENT DOCUMENTS

| | | | | |
|---|---|---|---|---|
| 2013/0307771 A1* | 11/2013 | Parker | .................. | G06F 3/0482 345/158 |
| 2014/0244096 A1* | 8/2014 | An | ........................ | G05D 1/0055 701/25 |
| 2017/0285741 A1* | 10/2017 | Park | ................... | G06K 9/00617 |

(Continued)

FOREIGN PATENT DOCUMENTS

DE   102013015205 B3 *  2/2015  .......... G06F 3/0484

*Primary Examiner* — Babar Sarwar
(74) *Attorney, Agent, or Firm* — Fish & Richardson P.C.

(57) ABSTRACT

A vehicle control method and an intelligent computing device for controlling a vehicle are disclosed. An intelligent computing device for controlling a vehicle according to an embodiment of the present disclosure acquires a direction of a line of sight of a passenger of a vehicle through at least one sensor included in the vehicle and displays driving information of the vehicle through at least one of a plurality of displays included in the vehicle on the basis of the direction of the line of sight of the passenger, to thereby provide convenience to the passenger. One or more of the autonomous vehicle, the intelligent computing device and the server of the present disclosure can be associated with artificial intelligence (AI) modules, unmanned aerial vehicle (UAV) robots, augmented reality (AR) devices, virtual reality (VR) devices, 5G service related devices, etc.

16 Claims, 16 Drawing Sheets

(56) References Cited

U.S. PATENT DOCUMENTS

2017/0315556 A1* 11/2017 Mimura ................. G08G 1/167
2018/0348758 A1* 12/2018 Nakamura ............ B60W 30/12
2020/0004332 A1* 1/2020 Jeon ................... G06K 9/00671

* cited by examiner

METHOD FOR CONTROLLING VEHICLE AND INTELLIGENT COMPUTING DEVICE FOR CONTROLLING VEHICLE

CROSS-REFERENCE TO RELATED APPLICATION(S)

This application claims priority under 35 U.S.C. 119 to Korean Patent Application No. 10-2019-0107827, filed on Aug. 31, 2019, the disclosure of which is herein incorporated by reference in its entirety.

BACKGROUND OF THE INVENTION

Field of the Invention

The present disclosure relates to a method for controlling a vehicle and an intelligent computing device for controlling a vehicle, and more specifically, to a method for controlling a vehicle and an intelligent computing device for controlling a vehicle which reflect state information of passengers.

Related Art

A vehicle is a means of transportation for moving a user in a desired direction and a car is a typical example. A user of such a vehicle needs to carefully concentrate on the front and the rear while providing convenience of movement. Here, the front and the rear may refer to objects approaching or located around a vehicle, that is, factors that obstruct driving such as peoples, vehicles and obstacles.

Accordingly, in a conventional system, a passenger periodically presses a drowsiness prevention button or an alarm is provided after a drowsy state of the passenger has been confirmed to cause the passenger to get out of a careless state or a drowsy state.

However, the passenger may experience inconvenience since the passenger need to periodically press the button even when they stay awake. Further, problems that accuracy of determination of drowsiness is low or a passenger does not have confidence in a drowsiness prevention system may occur.

SUMMARY OF THE INVENTION

An object of the present disclosure is to meet the needs and solve the problems.

Further, an object of the present disclosure is to display driving information in a direction of a line of sight of a passenger on the basis of a drowsy/wake-up state of the passenger.

A method for controlling a vehicle according to an aspect of the present disclosure includes: acquiring a direction of a line of sight of a passenger of the vehicle through at least one sensor included in the vehicle; and displaying driving information of the vehicle through at least one of a plurality of displays included in the vehicle on the basis of the direction of the line of sight of the passenger.

The method may further include acquiring state information of the passenger of the vehicle through the at least one sensor, wherein the displaying of the driving information of the vehicle includes displaying the driving information on the basis of the state information of the passenger.

The displaying of the driving information of the vehicle may include displaying the driving information when a state of the passenger is determined to be a wake-up state.

The displaying of the driving information of the vehicle may include stopping display of the driving information when a state of the passenger has changed from a wake-up state to a drowsy state.

The state information of the passenger may be determined on the basis of a pressure value applied to a head part of a seat on which the passenger sits.

The state information of the passenger may be determined to be the drowsy state when a pressure applied to the head part of the seat on which the passenger sits is detected as a value equal to or greater than a threshold value and determined to be the wake-up state when the pressure applied to the head part of the seat on which the passenger sits is detected as a value less than the threshold value.

The state information of the passenger may be determined on the basis of change in a face region of the passenger photographed by a camera sensor which photographs the passenger from among the at least one sensor.

The state information of the passenger may be determined to be the drowsy state when the size of a pupil included in the face region of the passenger decreases to below a predetermined size and determined to be the wake-up state when the size of the pupil increases to above the predetermined size.

The displaying of the driving information of the vehicle may include selecting at least one display corresponding to the direction of the line of sight of the passenger and displaying the driving information through the at least one display.

The plurality of displays may include one or more of a head-up display, an overhead display, a sun visor display, a window display, a sunroof display, a display provided on the backside of a front seat, and a ceiling display.

An intelligent device for controlling a vehicle according to another aspect of the present disclosure includes: a plurality of displays; at least one sensor; a processor; and a memory including commands executable by the processor, wherein the commands cause the processor to acquire a direction of a line of sight of a passenger of the vehicle through the at least one sensor and to display driving information of the vehicle through at least one of the plurality of displays on the basis of the direction of the line of sight of the passenger.

The processor may acquire state information of the passenger of the vehicle through the at least one sensor and display the driving information on the basis of the state information of the passenger.

The processor may display the driving information when a state of the passenger is determined to be a wake-up state.

The processor may stop display of the driving information when a state of the passenger has changed from a wake-up state to a drowsy state.

The state information of the passenger may be determined on the basis of a pressure value applied to a head part of a seat on which the passenger sits.

The state information of the passenger may be determined to be the drowsy state when a pressure applied to the head part of the seat on which the passenger sits is detected as a value equal to or greater than a threshold value and determined to be the wake-up state when the pressure applied to the head part of the seat on which the passenger sits is detected as a value less than the threshold value.

The state information of the passenger may be determined on the basis of change in a face region of the passenger photographed by a camera sensor which photographs the passenger from among the at least one sensor.

The state information of the passenger may be determined to be the drowsy state when the size of a pupil included in the face region of the passenger decreases to below a predetermined size and determined to be the wake-up state when the size of the pupil increases to above the predetermined size.

The processor may select at least one display corresponding to the direction of the line of sight of the passenger and display the driving information through the at least one display.

The plurality of displays may include one or more of a head-up display, an overhead display, a sun visor display, a window display, a sunroof display, a display provided on the backside of a front seat, and a ceiling display.

Referring to the vehicle control method and the effect of the intelligent device for controlling the vehicle according to the present disclosure.

According to the present disclosure, it is possible to provide convenience for a passenger by selecting a display positioned in a direction of a line of sight of the passenger and displaying driving information on the display.

Further, according to the present disclosure, it is possible to stop a display when a passenger is in a drowsy state to keep autonomous driving without disturbing sleep of the passenger.

It will be appreciated by persons skilled in the art that the effects that could be achieved with the present disclosure are not limited to what has been particularly described hereinabove and the above and other effects that the present disclosure could achieve will be more clearly understood from the following detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
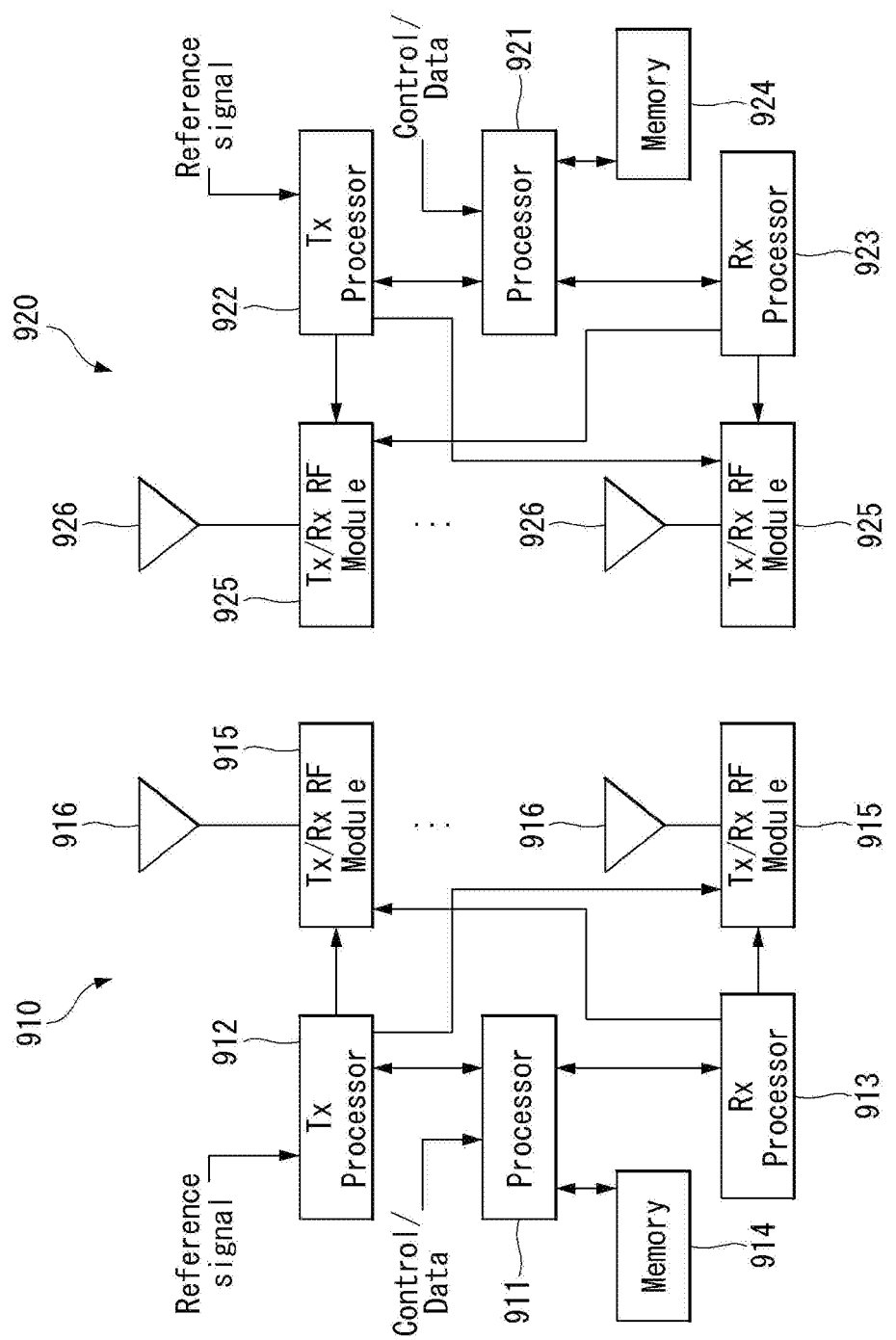
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
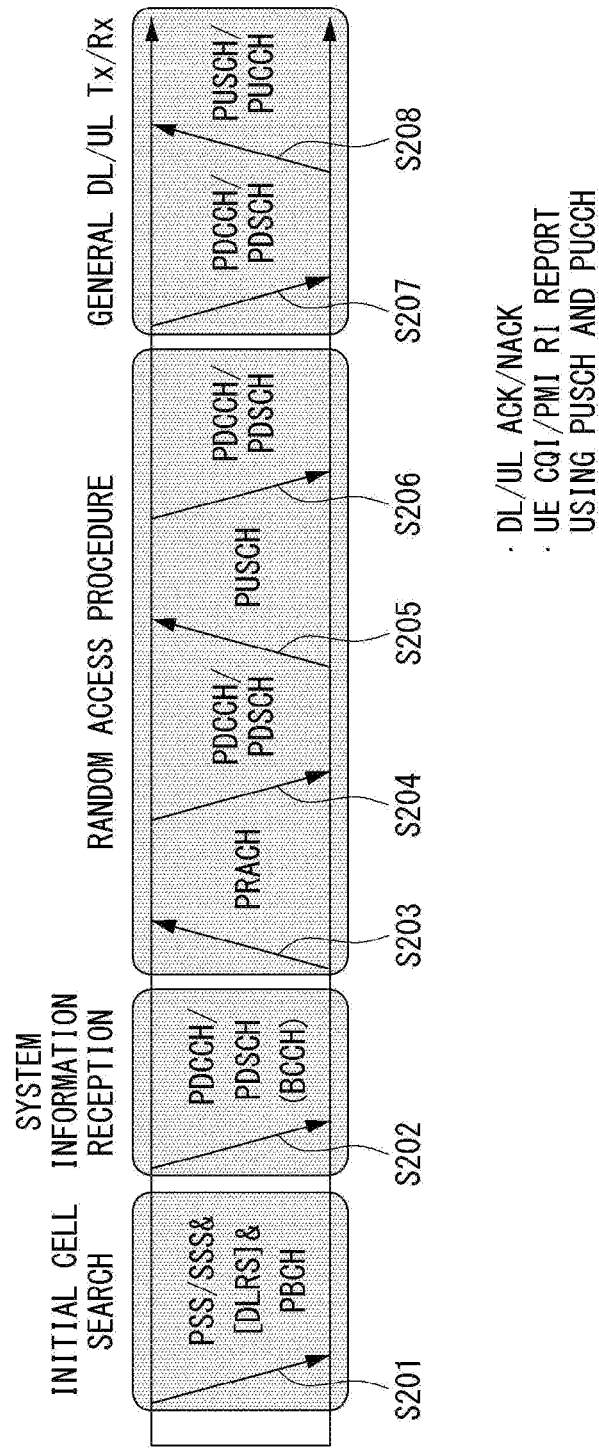
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.
- When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
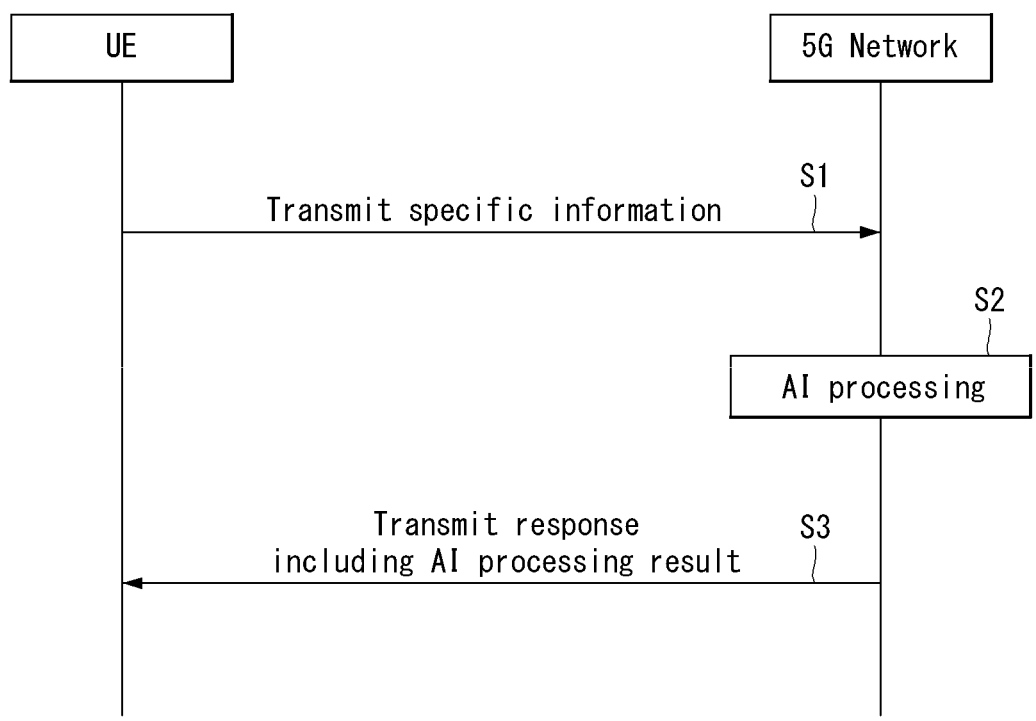
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
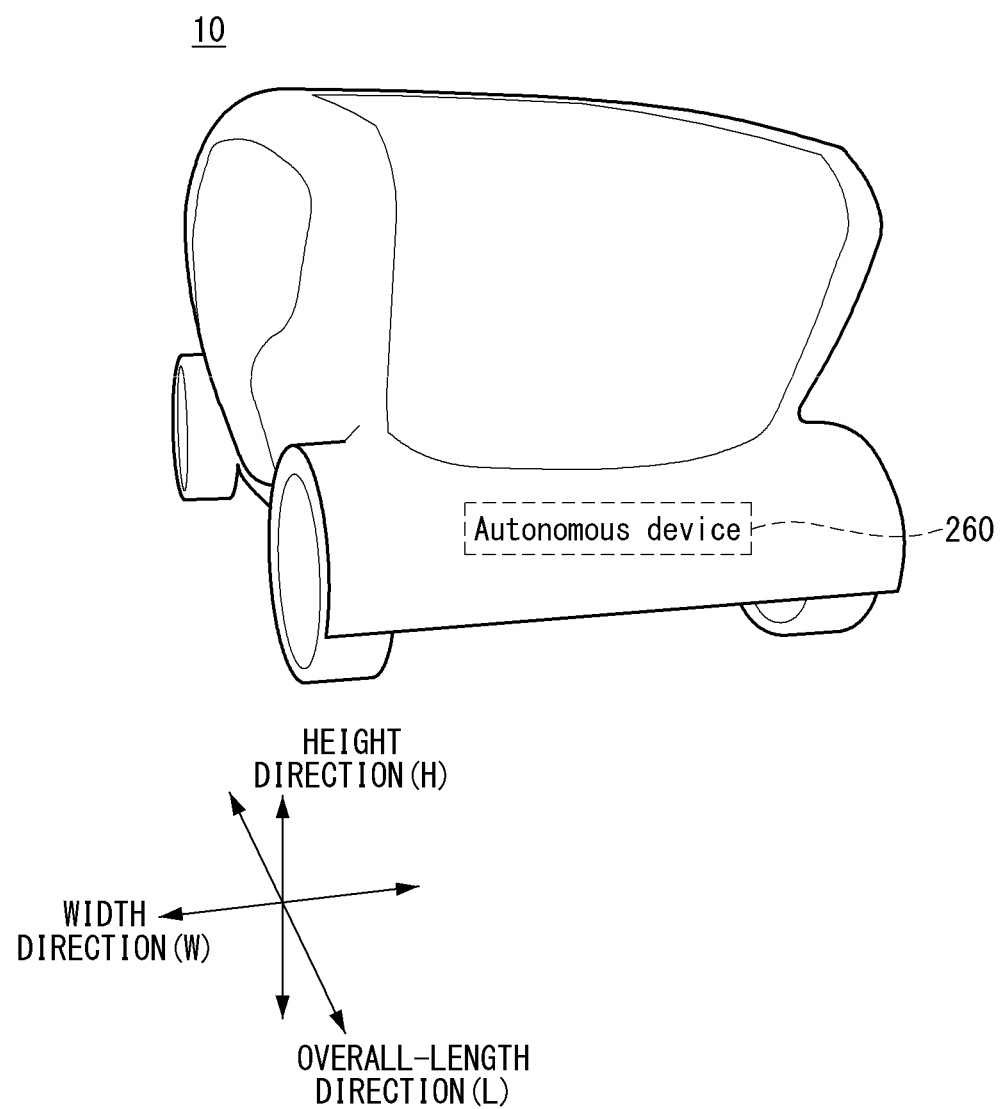
FIG. 4 is a diagram illustrating a vehicle according to an embodiment of the present disclosure.

FIG. 4 is a diagram illustrating a vehicle according to an embodiment of the present disclosure.

Referring to FIG. 4, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

Figure 5:
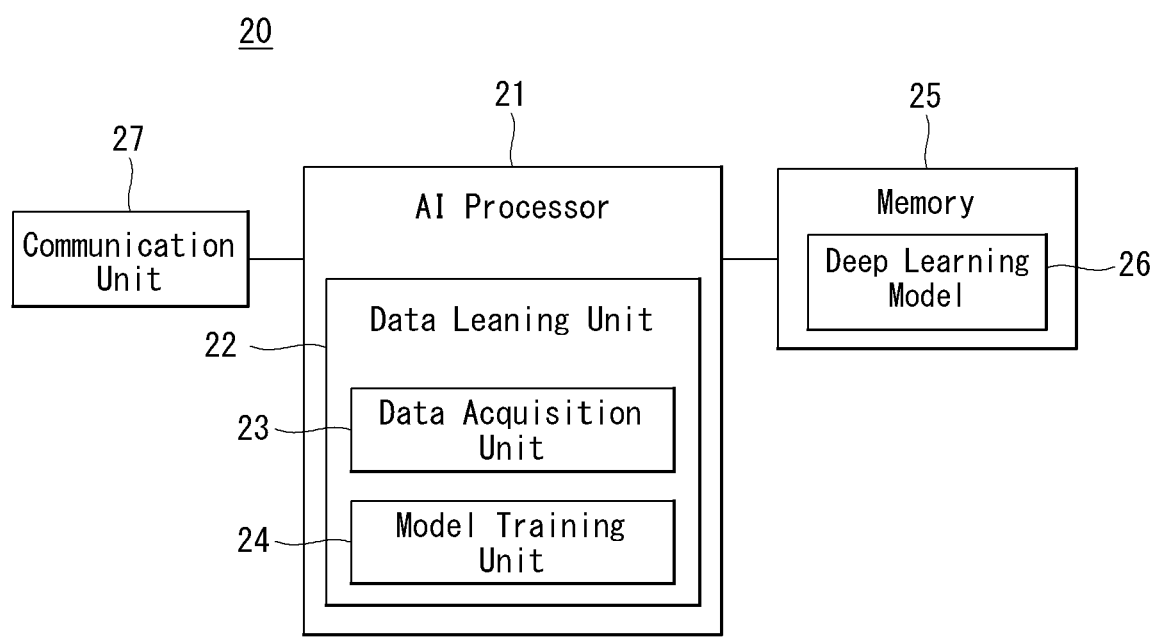
FIG. 5 is a block diagram of an AI device according to an embodiment of the present disclosure.

FIG. 5 is a diagram of an AI device according to an embodiment of the present disclosure.

The AI device 20 may include an electronic device including an AI module that can perform AI processing, a server including the AI module, or the like. Further, the AI device 20 may be included as a component of the vehicle 10 illustrated in FIG. 1 to perform at least a part of AI processing.

The AI processing may include all operations related to driving of the vehicle 10 illustrated in FIG. 4. For example, an autonomous vehicle can perform AI processing on sensing data or passenger data for processing/determination and control signal generation operations. Further, for example, the autonomous vehicle can perform autonomous driving control by performing AI processing on data acquired through interaction with other electronic devices included in the vehicle.

The AI device 20 may include an AI processor 21, a memory 25 and/or a communication unit 27.

The AI device 20 is a computing device that can learn a neural network and may be implemented as various electronic devices such as a server, a desktop PC, a notebook PC and a tablet PC.

The AI processor 21 can learn a neural network using a program stored in a memory 25. Particularly, the AI processor 21 can learn a neural network for recognizing vehicle related data. Here, the neural network for recognizing vehicle related data can be designed to simulate the structure of the human brain on a computer and include a plurality of network nodes having weights and simulating neurons of the human neural network. The plurality of network nodes can exchange data according to connection relation therebetween to simulate the synaptic activity of neurons which exchanges signals through synapse. Here, the neural network may include a deep learning model developed from a neural network model. In the deep learning model, the plurality of network nodes is located at different layers and can exchange data according to a convolution connection relation. Examples of the neural network include various deep learning techniques such as deep neural networks (DNNs), convolutional deep neural networks (CNNs), recurrent Boltzmann machine, restricted Boltzmann machine (RBM), deep belief networks (DBN), deep Q-network and may be applied to computer vision, speech recognition, natural language processing, audio/signal processing, and the like.

While a processor which executes the aforementioned functions can be a general-purpose processor (e.g., CPU), it may be an AI dedicated processor (e.g., GPU) for artificial intelligence learning.

The memory 25 can store various programs and data necessary for operation of the AI device 20. The memory 25 may be implemented as a non-volatile memory, a volatile memory, a flash memory, a hard disk drive (HDD), a solid state drive (SDD), or the like. The memory 25 can be accessed by the AI processor 21 and reading/recording/correction/deletion/update of data can be performed therein by the AI processor 21. Further, the memory 25 can store a neural network model (e.g., a deep learning model 26) generated through a learning algorithm for data classification/recognition according to an embodiment of the present disclosure.

Further, the AI processor 21 may include a data learning unit 22 for learning a neural network for data classification/recognition. The data learning unit 22 can learn standards for learning data to be used to determine data classification/recognition and methods of classifying and recognizing data using the learning data. The data learning unit 22 can learn a deep learning model by acquiring learning data to be used for learning and applying the acquired learning data to the deep learning model.

The data learning unit 22 can be manufactured in the form of at least one hardware chip and mounted in the AI device 20. For example, the data learning unit 22 may be manufactured in the form of a hardware chip dedicated for artificial intelligence (AI) or manufactured as a part of a general-purpose processor (CPU) or a graphic-only processor (GPU) and mounted in the AI device 20. Further, the data learning unit 22 may be implemented as a software module. When the data learning unit 22 is implemented as a software module (or a program module including instructions), the software module may be stored in non-transitory computer readable media. In this case, at least one software module may be provided by an operating system (OS) or an application.

The data learning unit 22 may include a learning data acquisition unit 23 and a model learning unit 24.

The learning data acquisition unit 23 can acquire learning data necessary for a neural network model for classifying and recognizing data. For example, the learning data acquisition unit 23 can acquire vehicle data and/or sample data to be input to the neural network model as learning data.

The model learning unit 24 can learn the neural network model to have criteria for how to classify predetermined data using the acquired learning data. Here, the model learning unit 24 can learn the neural network model through supervised learning using at least a part of the learning data as criteria. Alternatively, the model learning unit 24 can learn the neural network model through unsupervised learning by which criteria are discovered through unsupervised learning using learning data. Further, the model learning unit 24 can learn the neural network model through reinforcement learning using feedback for whether a situation determination result according to learning is correct. Further, the model learning unit 24 can learn the neural network model using a learning algorithm including error back-propagation or gradient decent.

When the neural network model is learned, the model learning unit 24 can store the learned neural network model in the memory. The model learning unit 24 may store the learned neural network model in a memory of a server connected to the AI device 20 in a wired or wireless manner.

The data learning unit 22 may further include a learning data pre-processor (not shown) and a learning data selector (not shown) in order to improve recognition model analysis results or save resources or time necessary to generate a recognition model.

The learning data pre-processor can pre-process acquired data such that the acquired data can be used for learning for situation determination. For example, the learning data pre-processor can process acquired data into a preset format such that the model learning unit 24 can use the acquired data for learning for image recognition.

Further, the learning data selector can select data necessary for learning from learning data acquired by the learning data acquisition unit 23 and learning data pre-processed by the pre-processor. The selected learning data can be provided to the model learning unit 24. For example, the learning data selector can detect a specific region of an image acquired through a camera of a vehicle to select only data with respect to an object included in the specific region as learning data.

Further, the data learning unit 22 may further include a model evaluator (not shown) for improving neural network model analysis results.

The model evaluator can input evaluation data to a neural network model and cause the model learning unit 22 to learn the neural network model again when analysis results output from the evaluation data do not satisfy a predetermined standard. In this case, the evaluation data may be predefined data for evaluating a recognition model. For example, when the number or rate of pieces of evaluation data for which analysis results are not correct from among analysis results of a recognition model learned for the evaluation data exceeds a predetermined threshold value, the model evaluator can evaluate that the analysis results do not satisfy the predetermined standard.

The communication unit 27 can transmit AI processing results obtained by the AI processor 21 to an external electronic device.

Here, the external electronic device can be defined as an autonomous vehicle. Further, the AI device 20 can be defined as another vehicle or a 5G network which communicates with the autonomous vehicle. Meanwhile, the AI device 20 may be implemented by being functionally embedded in an autonomous driving module included in a vehicle. Further, the 5G network may include a server or a module which performs autonomous driving related control.

Although the AI device 20 illustrated in FIG. 5 has separate functional units such as the AI processor 21, the memory 25 and the communication unit 27, the aforementioned components may be integrated into one module and called an AI module.

Figure 6:
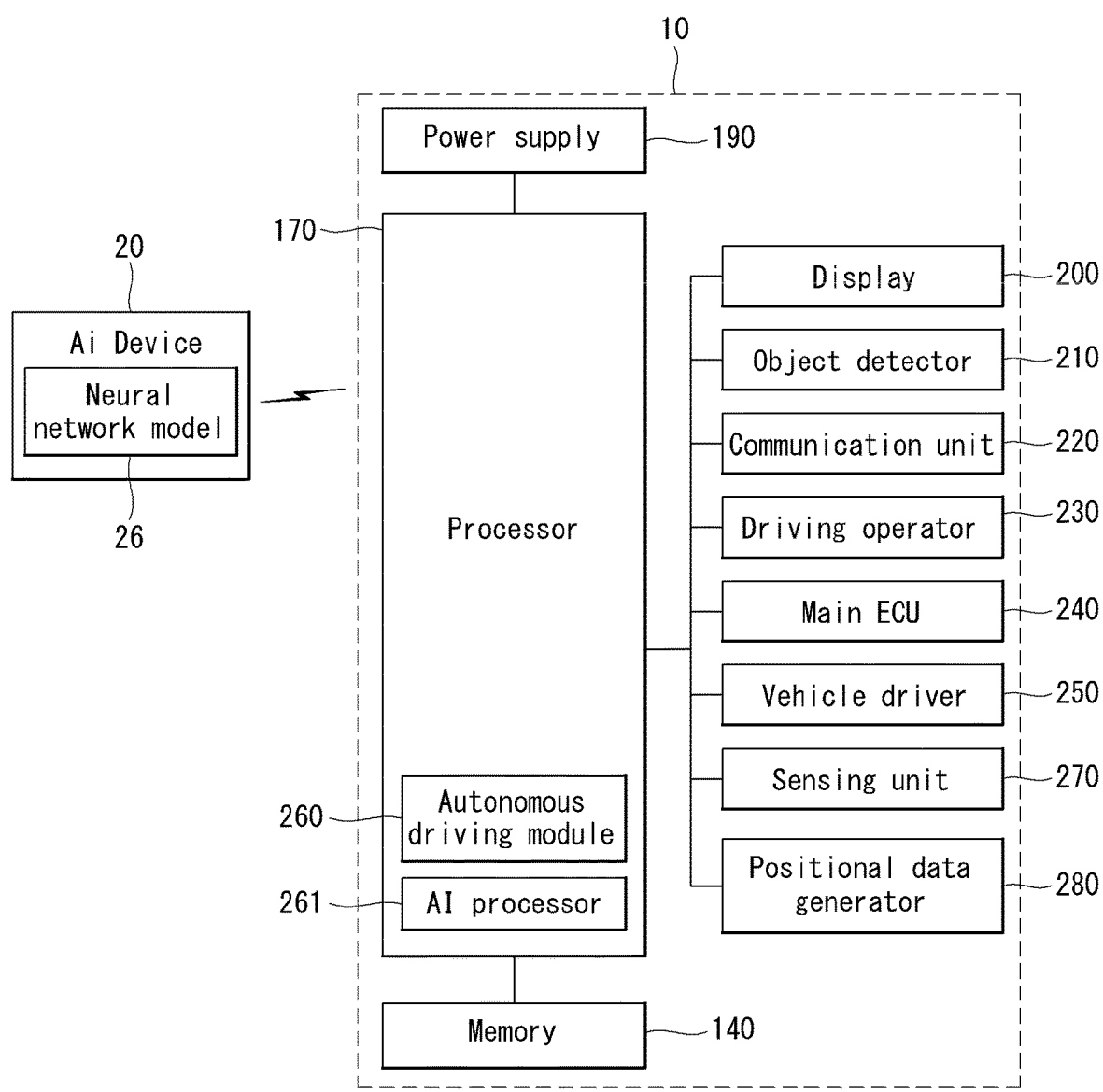
FIG. 6 is a diagram for explaining a system in which an autonomous vehicle is associated with an AI device according to an embodiment of the present disclosure.

FIG. 6 is a diagram for explaining a system in which an autonomous vehicle is associated with an AI device according to an embodiment of the present disclosure.

Referring to FIG. 6, the autonomous vehicle 10 can transmit data that requires AI processing to the AI device 20 through a communication unit and the AI device 20 including the deep learning model 26 can transmit AI processing results obtained using the deep learning model 26 to the autonomous vehicle 10. Refer to the description with reference to FIG. 2 for the AI device 20.

The autonomous vehicle 10 may include a memory 140, a processor 170 and a power supply 190 and the processor 170 may further include an autonomous driving module 260 and an AI processor 261. Further, the autonomous vehicle 10 may include an interface which is connected to at least one electronic device included in the vehicle in a wired or wireless manner and can exchange data necessary for autonomous driving control. The at least one electronic device connected through the interface may include an object detector 210, a communication unit 220, a driving operator 230, a main ECU 240, a vehicle driver 250, a sensing unit 270, and a positional data generator 280.

The interface can be configured in the form of at least one of a communication module, a terminal, a pin, a cable, a port, a circuit, an element and a device.

The memory 140 is electrically connected to the processor 170. The memory 140 can store basic data with respect to a unit, control data for operation control of a unit, and input/output data. The memory 140 can store data processed in the processor 170. The memory 140 can be configured as at least one of a ROM, a RAM, an EPROM, a flash drive and a hard drive in a hardware manner. The memory 140 can store various types of data for overall operation of the autonomous vehicle 10, such as a program for processing or control of the processor 170. The memory 140 may be integrated with the processor 170. According to an embodiment, the memory 140 may be categorized as a subcomponent of the processor 170.

The power supply 190 can provide power to the autonomous vehicle 10. The power supply 190 can be provided with power from a power source (e.g., a battery) included in the autonomous vehicle 10 and supply power to each unit of the autonomous vehicle 10. The power supply 190 can operate according to a control signal provided from the main ECU 240. The power supply 190 may include a switched-mode power supply (SMPS).

The processor 170 can be electrically connected to the memory 140, the interface 280 and the power supply 190 and exchange signals therewith. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be driven by power provided from the power supply 190. The processor 170 can receive data in a state in which power is supplied thereto from the power supply 190, process data, generate signals and provide signals.

The processor 170 can receive information from other devices in the autonomous vehicle 10 through the interface. The processor 170 can provide control signals to other electronic devices in the autonomous vehicle 10 through the interface.

The autonomous vehicle 10 may include at least one printed circuit board (PCB). The memory 140, the interface, the power supply 190 and the processor 170 can be electrically connected to the PCB.

Hereinafter, other electronic devices in the vehicle which are connected to the interface, the AI processor 261, the autonomous driving module 260 will be described in more detail. For convenience of description, the autonomous vehicle 10 will be called a vehicle 10.

First, the object detector 210 can generate information about objects outside the vehicle 10. The AI processor 261 can generate at least one of information on presence or absence of an object, positional information of the object, information on a distance between the vehicle and the object, and information on a relative speed between the vehicle and the object by applying a neural network model to data acquired through the object detector 210.

The object detector 210 may include at least one sensor which can detect an object outside the vehicle 10. The sensor may include at least one of a camera, a radar, a lidar, an ultrasonic sensor and an infrared sensor. The object detector 210 can provide data about an object generated on the basis of a sensing signal generated in the sensor to at least one electronic device included in the vehicle.

The vehicle 10 can transmit data acquired through the at least one sensor to the AI device 20 through the communication unit 220 and the AI device 20 can transmit AI processing data generated by applying the neural network model 26 to the transmitted data to the vehicle 10. The vehicle 10 can recognize information about a detected object on the basis of received AI processing data and the autonomous driving module 260 can perform an autonomous driving control operation using the recognized information.

The communication unit 220 can exchange signals with devices located outside the vehicle 10. The communication device 220 can exchange signals with at least one of infrastructures (e.g., a server and a broadcasting station), other vehicles, and terminals. The communication unit 220 may include at least one of a transmission antenna, a reception antenna, a radio frequency (RF) circuit capable of implementing various communication protocols, and an RF element for performing communication.

It is possible to generate at least one of information on presence or absence of an object, positional information of the object, information on a distance between the vehicle and the object, and information on a relative speed between the vehicle and the object by applying the neural network model to data acquired through the object detector 210.

The driving operator 230 is a device which receives user input for driving. In a manual mode, the vehicle 10 can travel on the basis of a signal provided by the driving operator 230. The driving operator 230 may include a steering input device (e.g., a steering wheel), an acceleration input device (e.g., an accelerator pedal), and a brake input device (e.g., a brake pedal).

The AI processor 261 can generate an input signal of the driving operator 230 according to a signal for controlling movement of the vehicle according to a driving plan generated through the autonomous driving module 260 in an autonomous driving mode.

The vehicle 10 can transmit data necessary for control of the driving operator 230 to the AI device 20 through the communication unit 220, and the AI device 20 can transmit AI processing data generated by applying the neural network model 26 to the transmitted data to the vehicle 10. The vehicle 10 can use the input signal of the driving operator 230 for control of movement of the vehicle on the basis of the received AI processing data.

The main ECU 240 can control overall operation of at least one electronic device included in the vehicle 10.

The vehicle driver 250 is a device which electrically controls various vehicle driving devices in the vehicle 10. The vehicle driver 250 may include a power train driving control device, a chassis driving control device, a door/window driving control device, a safety device driving control device, a lamp driving control device and an air-conditioner driving control device. The power train driving control device may include a power source driving control device and a transmission driving control device. The chassis driving control device may include a steering driving control device, a brake driving control device and a suspension driving control device. Further, the safety device driving control device may include a safety belt driving control device for safety belt control.

The vehicle driver 250 includes at least one electronic control device (e.g., a control electronic control unit (ECU)).

The vehicle driver 250 can control a power train, a steering device and a brake device on the basis of signals received from the autonomous driving module 260. The signals received from the autonomous driving module 260 may be driving control signals generated by applying vehicle related data to the neural network model in the AI processor 261. The driving control signals may be signals received from the AI device 20 through the communication unit 220.

The sensing unit 270 can senses a state of the vehicle. The sensing unit 270 may include at least one of an inertial measurement unit (IMU) sensor, a collision sensor, a wheel sensor, a speed sensor, an inclination sensor, a weight sensor, a heading sensor, a position module, a vehicle forward/reverse movement sensor, a battery sensor, a fuel sensor, a tire sensor, a steering sensor, a temperature sensor, a humidity sensor, an ultrasonic sensor, an illumination sensor, and a pedal position sensor. The IMU sensor may include at least one of an acceleration sensor, a gyro sensor and a magnetic sensor.

The AI processor 261 can generate state data of the vehicle by applying the neural network model to sensing data generated in the at least one sensor. AI processing data generated using the neural network model may include vehicle position data, vehicle motion data, vehicle yaw data, vehicle roll data, vehicle pitch data, vehicle collision data, vehicle heading data, vehicle angle data, vehicle speed data, vehicle acceleration data, vehicle tilting data, vehicle forward/reverse movement data, vehicle weight data, battery data, fuel data, tire pressure data, vehicle internal temperature data, vehicle internal humidity data, steering wheel rotation angle data, vehicle outside illumination data, data of a pressure applied to an accelerator pedal, and data of a pressure applied to a brake pedal.

The autonomous driving module 260 can generate a driving control signal on the basis of AI-processed vehicle state data.

Meanwhile, the vehicle 10 can transmit sensing data acquired through at least one sensor to the AI device 20 through the communication unit 22 and the AI device 20 can transmit AI processing data generated by applying the neural network model 26 to the transmitted sensing data to the vehicle 10.

The positional data generator 280 can generate positional data of the vehicle 10. The positional data generator 280 can include at least one of a global positioning system (GPS) and a differential global positioning system (DGPS).

The AI processor 261 can generate more accurate positional data of the vehicle by applying the neural network model to positional data generated in at least one positional data generating device.

According to an embodiment, the AI processor 261 can perform a deep learning operation on the basis of at least one of an IMU of the sensing unit 270 and a camera image of the object detector 210 and correct positional data on the basis of the generated AI processing data.

The vehicle 10 can transmit the positional data acquired from the positional data generator 280 to the AI device 20 through the communication unit 220 and the AI device 20 can transmit AI processing data generated by applying the neural network model 26 to the received positional data to the vehicle 10.

The vehicle 10 can include an internal communication system 50. A plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

The autonomous driving module 260 can generate a path for autonomous driving on the basis of acquired data and generate a driving plan for driving along the generated path.

The autonomous driving module 260 can implement at least one advanced driver assistance system (ADAS) function. The ADAS can implement at least one of an adaptive cruise control (ACC) system, an autonomous emergency braking (AEB) system, a forward collision warning (FCW) system, a lane keeping assist (LKS) system, a lane change assist (LCA) system, a target following assist (TFA) system, a blind spot detection (BSD) system, an adaptive high beam assist (HBA) system, an auto parking system (APS), a PD collision warning system, a traffic sign recognition (TSR) system, a traffic sign assist (TSA) system, a night vision (NV) system, a driver status monitoring (DSM) system and a traffic jam assist (TJA) system.

The AI processor 261 can transmit a control signal for executing at least one of the aforementioned ADAS functions to the autonomous driving module 260 by applying information received from at least one sensor included in the vehicle, traffic related information received from an external device and information received from other vehicles communicating with the vehicle to the neural network model.

Further, the vehicle 10 can transmit data for executing ADAS functions to the AI device 20 through the communication unit 220 and the AI device 20 can transmit control signals for executing the ADAS functions to the vehicle 10 by applying the neural network model 26 to the received data.

The autonomous driving module 260 can acquire state information of a driver and/or state information of the vehicle through the AI processor 261 and perform an operation of switching from an autonomous driving mode to a manual driving mode or an operation of switching from the manual driving mode to the autonomous driving mode on the basis of the acquired information.

The vehicle 10 can use AI processing data for passenger assistance for driving control. For example, states of a driver and a passenger can be checked through at least one sensor included in the vehicle as described above.

Further, the vehicle 10 can recognize a voice signal of a driver or a passenger through the AI processor 161, perform a voice processing operation and perform a voice synthesis operation.

5G communication necessary to realize the vehicle control method according to an embodiment of the present disclosure and a method of performing AI processing through 5G communication and transmitting/receiving AI processing results have been described.

Hereinafter, a detailed method for intervening in a careless state of a driver passively or actively on the basis of driver state information according to an embodiment of the present disclosure will be described with reference to necessary drawings.

According to an embodiment of the present disclosure, the object detector 210 in FIG. 6 may include at least one camera sensor which can photograph a passenger in the vehicle 10. Further, according to an embodiment of the present disclosure, the object detector 210 in FIG. 6 may include at least one microphone sensor which can detect a voice signal in the vehicle 10.

Hereinafter, an intelligent computing device for controlling a vehicle may include at least parts of components of the AI device 20 of FIG. 5 and the vehicle 10 of FIG. 6. For example, the intelligent computing device for controlling a vehicle may include a plurality of displays 200 included in the vehicle. As another example, the intelligent computing device for controlling a vehicle may include at least one sensor 210 included in the vehicle.

Figure 7:
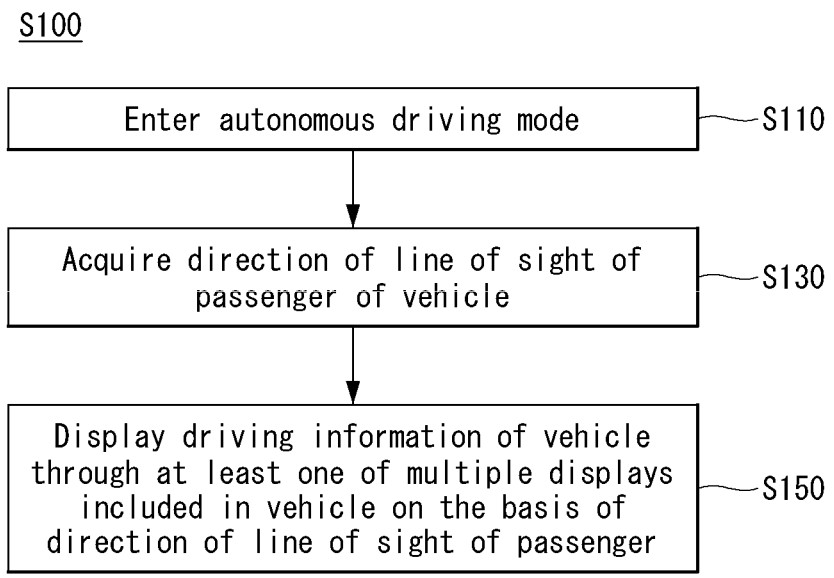
FIG. 7 is a flowchart illustrating a vehicle control method according to an embodiment of the present disclosure.

FIG. 7 is a flowchart illustrating a vehicle control method according to an embodiment of the present disclosure.

As shown in FIG. 7, the vehicle control method according to an embodiment of the present disclosure includes steps S110 to S150 which will be described below.

First, the intelligent computing device for controlling a vehicle causes a vehicle to enter an autonomous driving mode (S110).

Subsequently, the intelligent computing device for controlling a vehicle can acquire a direction of a line of sight of a passenger of the vehicle (S130). For example, the intelligent computing device for controlling a vehicle can photograph the interior of the vehicle using at least one camera included in the vehicle and acquire a direction of a line of sight of the passenger of the vehicle on the basis of a captured image of the interior of the vehicle.

Subsequently, the intelligent computing device for controlling a vehicle can display driving information of the vehicle through at least one of a plurality of displays included in the vehicle on the basis of the direction of the line of sight of the passenger (S150).

For example, the intelligent computing device for controlling a vehicle can display driving information of the vehicle through a specific display positioned in the direction of the line of sight of the passenger from among the plurality of displays.

Figure 8:
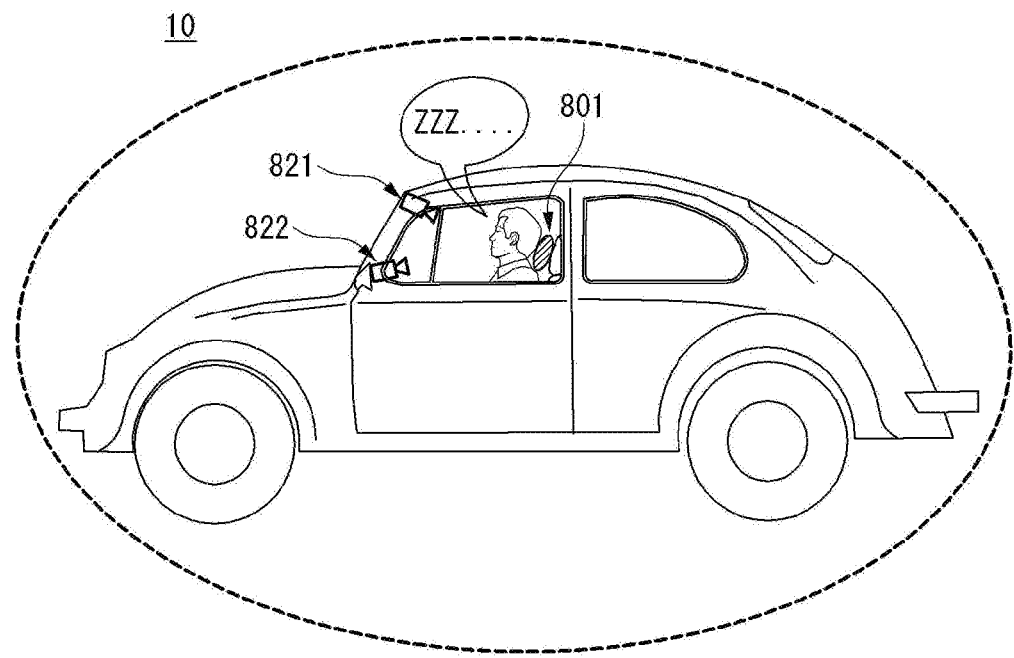
FIG. 8 illustrates a vehicle according to an embodiment of the present disclosure.

FIG. 8 illustrates a vehicle according to an embodiment of the present disclosure.

As illustrated in FIG. 8, according to an embodiment of the present disclosure, the intelligent computing device for controlling the vehicle 10 may include at least one camera sensor 821 or 822 and at least one pressure sensor 801.

For example, the camera sensors 821 822 can photograph the interior of the vehicle. For example, the pressure sensor 801 can detect a pressure applied by a passenger to a seat.

Figure 9:
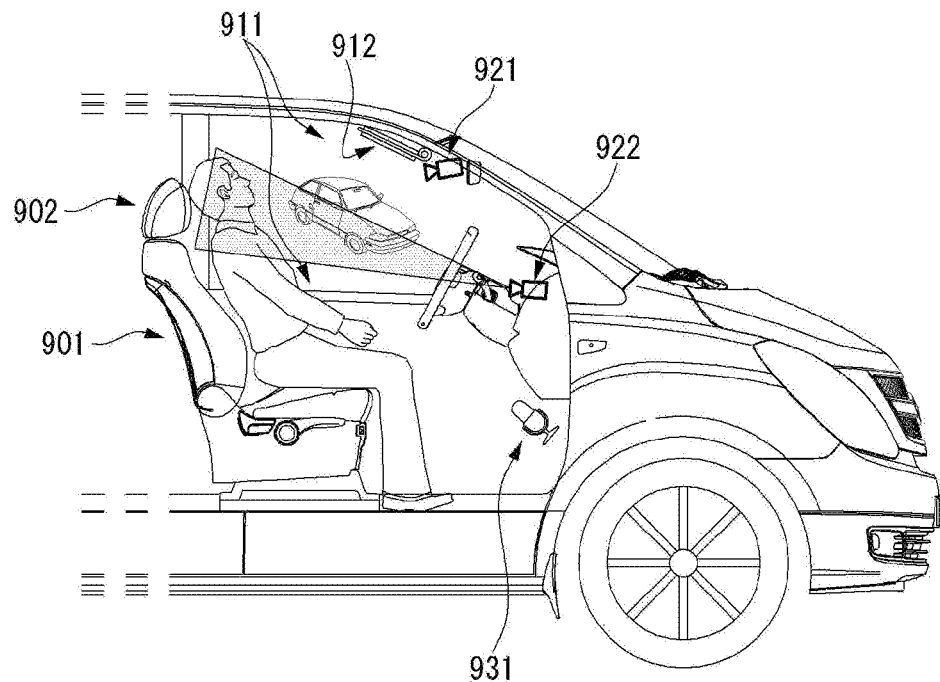
FIG. 9 illustrates an example of the interior of a vehicle according to an embodiment of the present disclosure.

FIG. 9 illustrates an example of the interior of a vehicle according to an embodiment of the present disclosure.

As illustrated in FIG. 9, the intelligent computing device for controlling a vehicle may include a plurality of camera sensors 921 and 922, at least one pressure sensor 902, a plurality of displays 911 and 912 and at least one microphone sensor 931.

Here, the plurality of camera sensors 921 and 922 can photograph the interior of the vehicle, a passenger and the pupils in the face of the passenger. The processor (e.g., the AI processor 21 of FIG. 5 or the processor 170 of FIG. 6) of the intelligent computing device for controlling a vehicle can determine a direction of a line of sight of the passenger on the basis of the captured image of the pupils.

Here, the plurality of pressure sensors 902 can detect a pressure value applied to a seat. For example, the processor of the intelligent computing device for controlling a vehicle can determine that the passenger is in a drowsy state when a sensing value is equal to or greater than a threshold value and determine that the passenger is in a wake-up state when the sensing value is less than the threshold value.

Here, the processor can determine a drowsy state of the passenger on the basis of inclination of a seat 901. For example, the processor can determine that the passenger is in a drowsy state when the seat tilts by more than a threshold value and determine that the passenger is in a wake-up state when the seat tilts by less than the threshold value.

Further, the processor can determine state information of the passenger on the basis of speech of the passenger detected through the at least one microphone 931. For example, the processor can determine that the passenger is in a drowsy state when speech of the passenger detected through the at least one microphone is equal to or less than a specific number of words per unit time.

The processor may select a specific display from the plurality of displays 911 and 912 on the basis of the direction of the line of sight of the passenger and may or may not display driving information on the selected display on the basis of state information of the passenger.

For example, the plurality of displays may include a window display 911 and a first sun visor display 912 provided on the outer surface of a sun visor.

Figure 10:
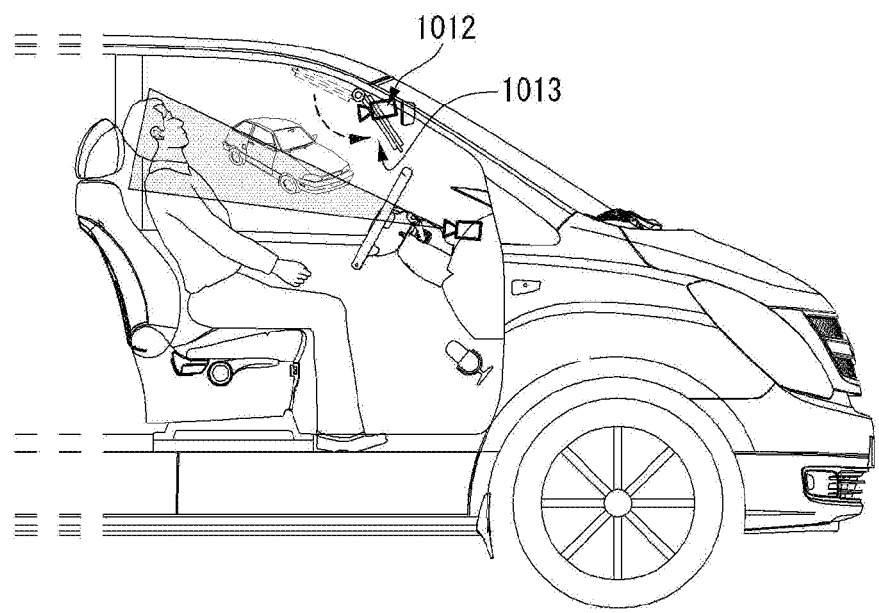
FIG. 10 illustrates another example of the interior of a vehicle according to an embodiment of the present disclosure.

FIG. 10 illustrates another example of the interior of a vehicle according to an embodiment.

As illustrated in FIG. 10, a plurality of displays may include a first sun visor display 1012 provided on the outer surface of a sun visor and a second sun visor display 1013 provided on the internal surface of the sun visor.

If the sun visor is closed, the first sun visor display 1012 can be maintained in an activated state and the second sun visor display 1013 can be maintained in a deactivated state.

If the sun visor is opened, the second sun visor display 1013 can be maintained in an activated state and the first sun visor display 1012 can be maintained in a deactivated state.

Figure 11:
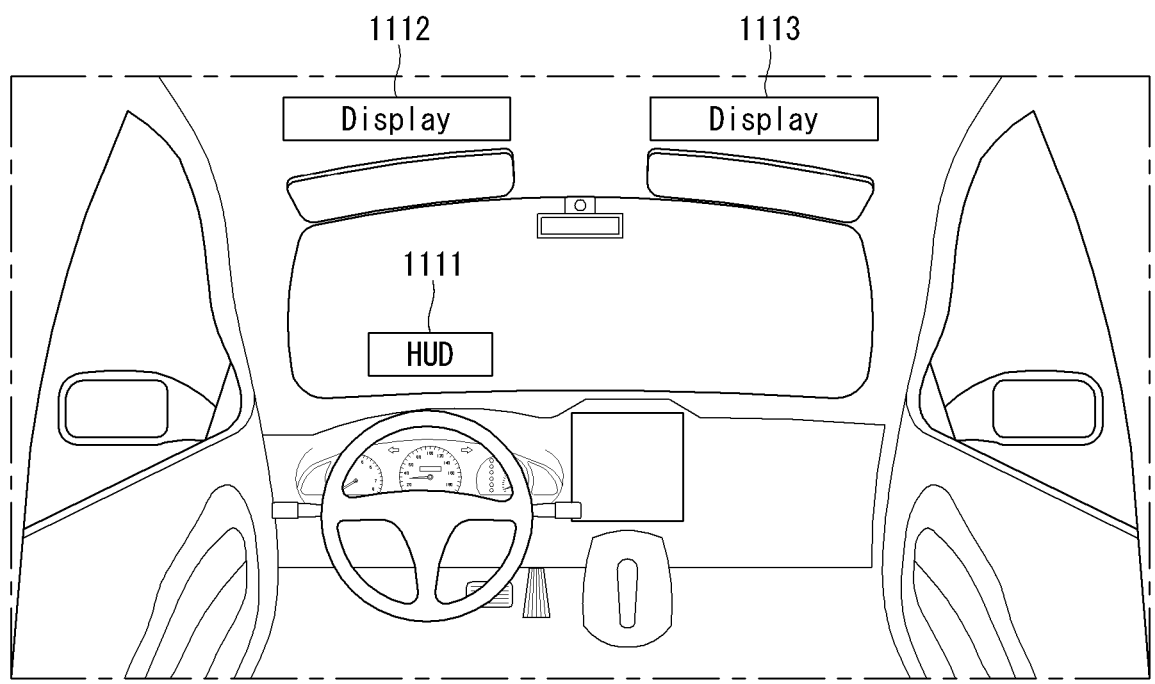
FIG. 11 illustrates another example of the interior of a vehicle according to an embodiment of the present disclosure.

FIG. 11 illustrates another example of the interior of a vehicle according to an embodiment.

As illustrated in FIG. 11, a plurality of displays may include a head-up display 1111 and overhead displays 1112 and 1113 according to an embodiment of the present disclosure.

For example, when a direction of a line of sight of a passenger is upward inside the vehicle, the processor can activate the overhead display and display driving information through the overhead display.

For example, when the line of sight of the passenger passes through a steering wheel to face the front windshield, the processor can activate the head-up display and display driving information through the head-up display.

Further, when the direction of the line of sight of the passenger changes, the processor can deactivate a display on which driving information has been displayed before the direction of the line of sight of the passenger changes and display the driving information through a display positioned in a changed direction of the line of sight of the passenger after the direction of the line of sight changes.

Figure 12:
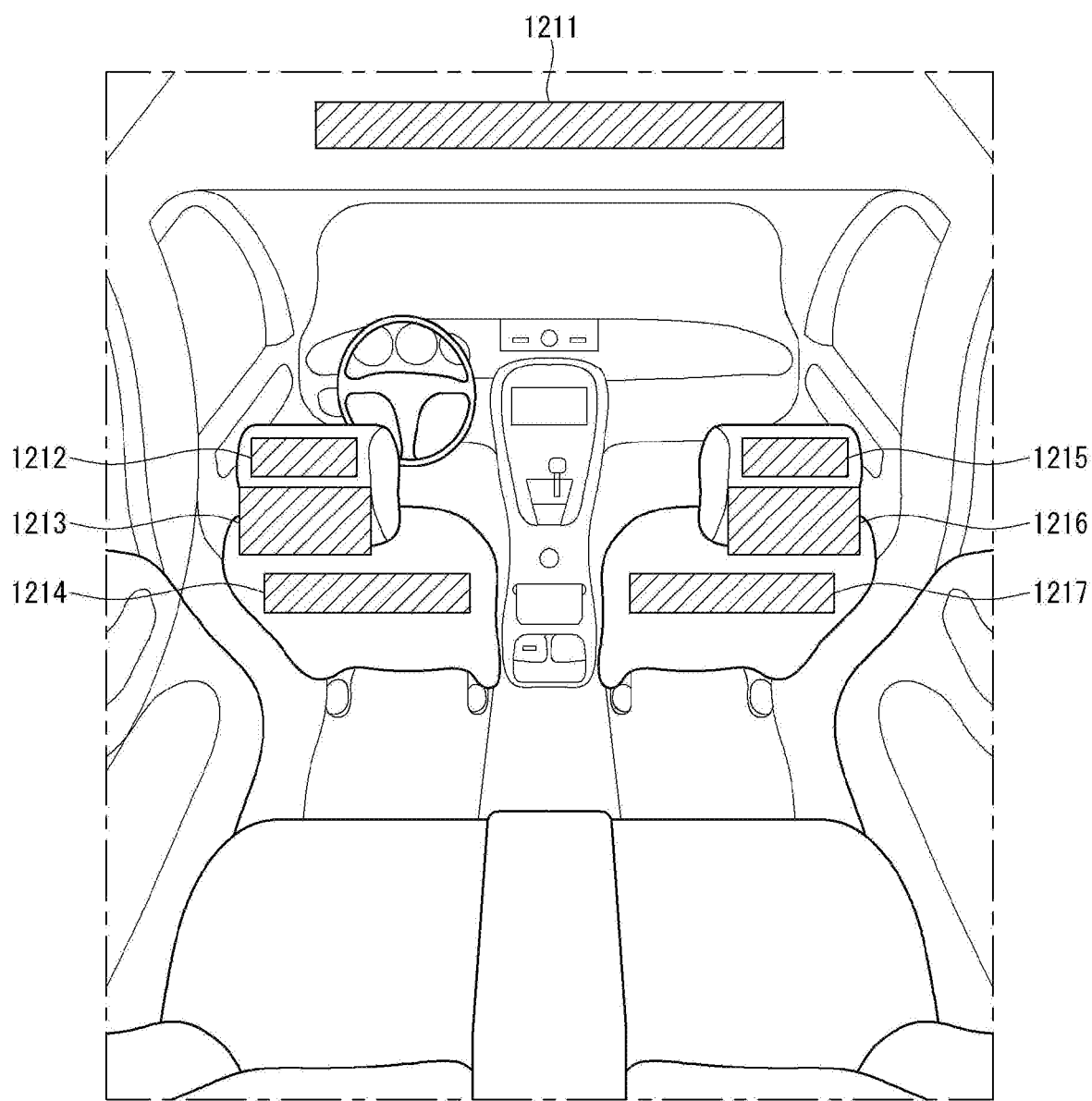
FIG. 12 illustrates another example of the interior of a vehicle according to an embodiment of the present disclosure.

FIG. 12 illustrates another example of the interior of a vehicle according to an embodiment.

As illustrated in FIG. 12, a plurality of displays may include a sunroof display 1211 and displays 1212, 1213, 1214, 1215, 1216 and 1217 provided on the backsides of front seats according to an embodiment of the present disclosure.

When a direction of a line of sight of a passenger sitting on a backseat is upward, the processor can activate the displays 1212, 1213, 1214, 1215, 1216 and 1217 provided on the backsides of the front seats and display driving information thereon.

Figure 13:
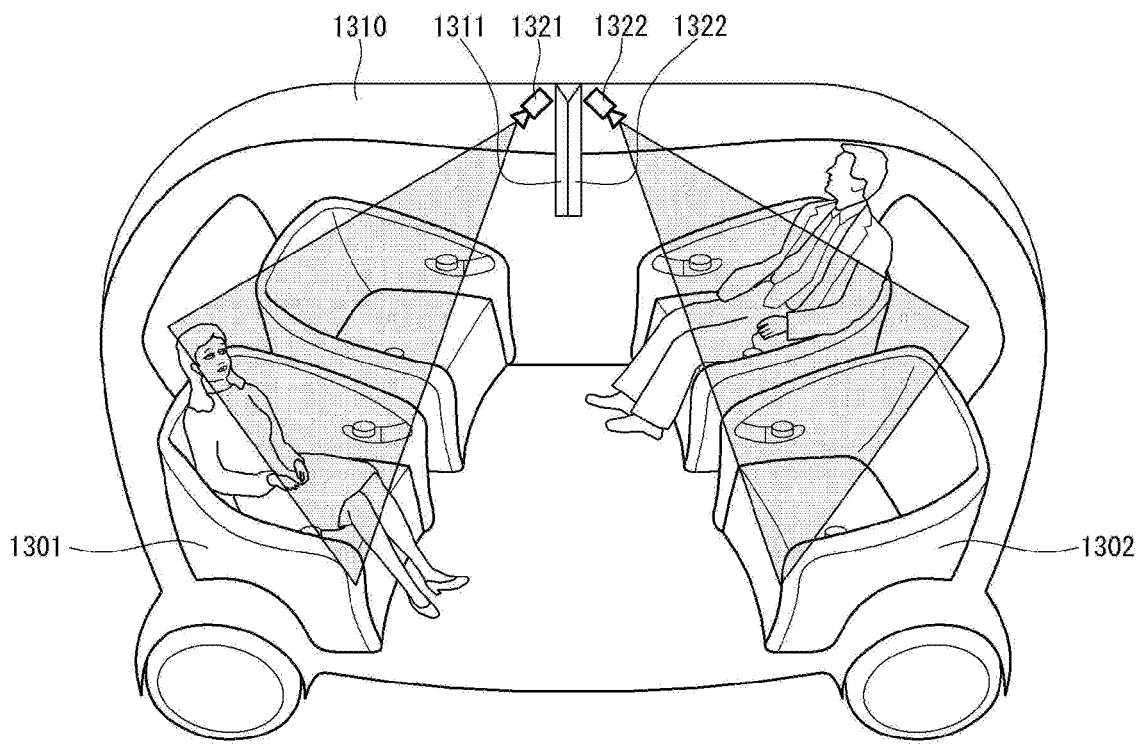
FIG. 13 illustrates another example of the interior of a vehicle according to an embodiment of the present disclosure.

FIG. 13 illustrates another example of the interior of a vehicle according to an embodiment.

As illustrated in FIG. 13, the intelligent computing device may include a plurality of camera sensors 1321 and 1322 provided on the ceiling of a vehicle. The plurality of camera sensors provided on the ceiling can photograph face regions of passengers in both-side directions.

For example, the computing device may include a plurality of ceiling displays 1311 and 1313 provided on the ceiling. If a line of sight of a passenger faces the ceiling, the processor can display driving information through the plurality of ceiling displays 1311 and 1313.

Figure 14:
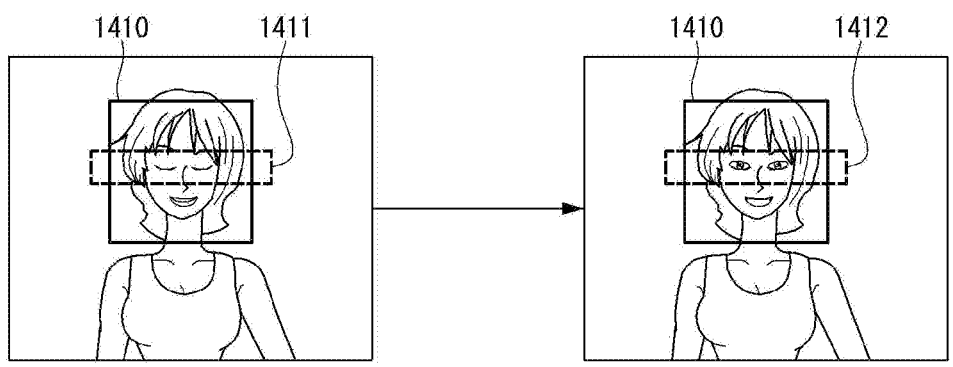
FIG. 14 illustrates an example of determining a drowsy state of a passenger according to an embodiment of the present disclosure.

FIG. 14 illustrates an example of determining a drowsy state of a passenger according to an embodiment of the present disclosure.

As illustrated in FIG. 14, the processor can analyze a pupil part 1411 of a face region 1410 of a passenger captured by a camera.

When pupils of the pupil part decrease to less than a threshold value as an analysis result, the processor can determine that the passenger is in a drowsy state.

When pupils of the pupil part increase again to higher than the threshold value (1412), the processor can determine that the passenger has entered a wake-up state from a drowsy state.

Figure 15:
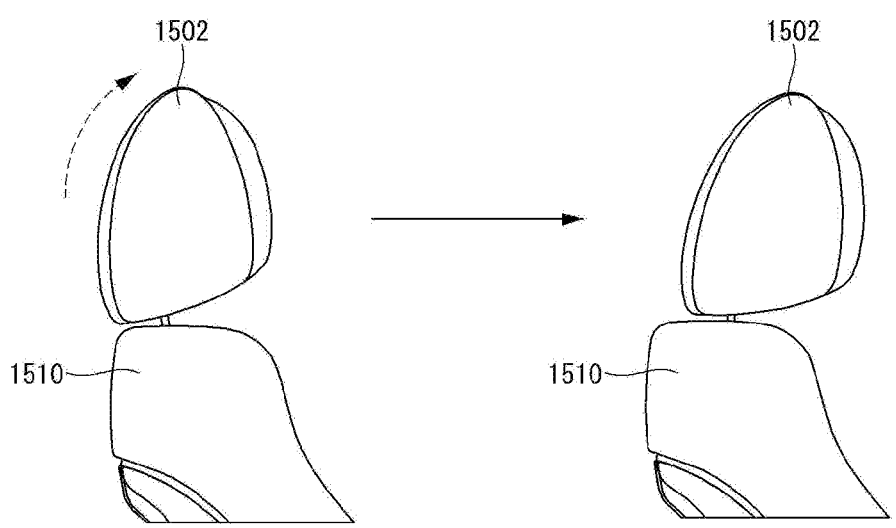
FIG. 15 illustrates another example of determining a drowsy state of a passenger according to an embodiment of the present disclosure.

FIG. 15 illustrates another example of determining a drowsy state of a passenger according to an embodiment of the present disclosure.

As illustrated in FIG. 15, the processor can determine that the passenger is in a wake-up state when the head 1502 of a seat 1501 tilts forward according to an embodiment of the present disclosure.

On the contrary, the processor can determine that the passenger has entered a drowsy state from a wake-up state when the head 1502 of a seat 1501 tilts backward.

Figure 16:
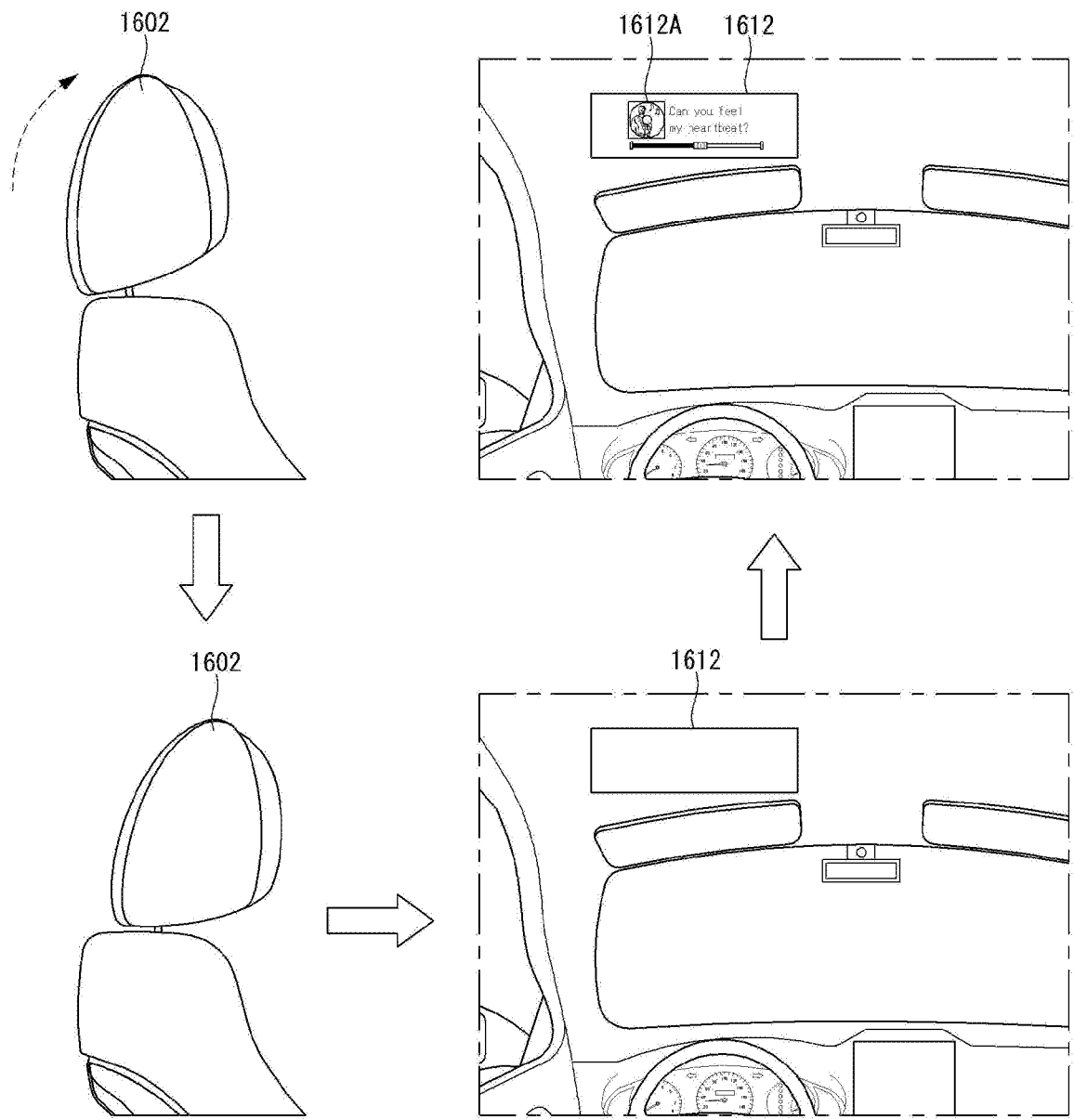
FIG. 16 illustrates an example of starting a display in a wake-up state of a passenger.

FIG. 16 illustrates an example of starting a display in a wake-up state of a passenger.

As illustrated in FIG. 16, according to an embodiment of the present disclosure, when the head 1602 of a seat tilts forward, the processor can detect tilting and recognize that a passenger has entered a wake-up state from a drowsy state.

Upon recognizing that the passenger has entered a wake-up state from a drowsy state, the processor can acquire a direction of a line of sight of the passenger using at least one camera included in the vehicle. Then, the processor can activate an overhead display 1612 in a deactivated state positioned in the direction of the line of sight and display driving information 1612A thereon.

Figure 17:
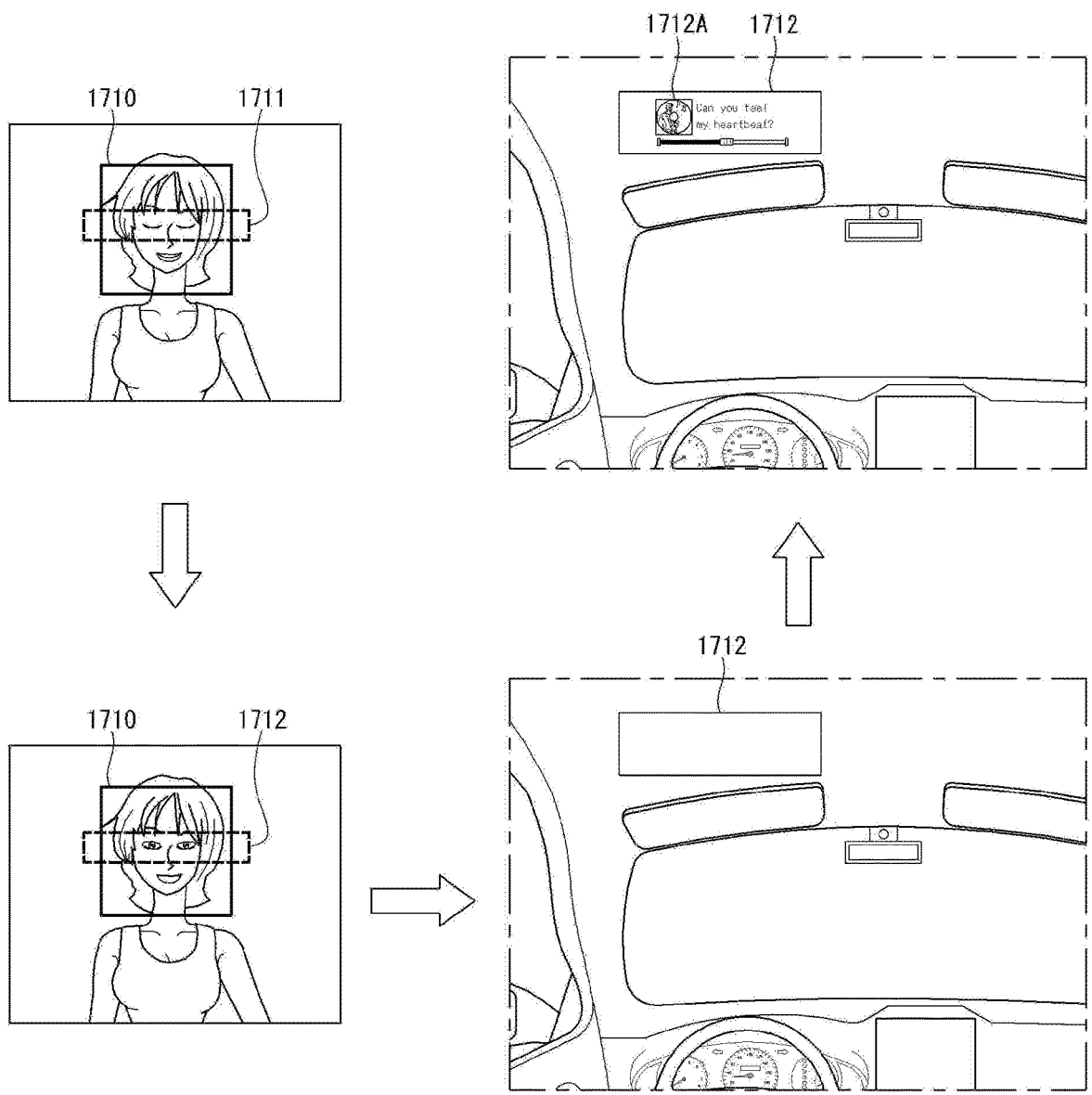
FIG. 17 illustrates another example of starting a display in a wake-up state of a passenger.

FIG. 17 illustrates another example of starting a display in a wake-up state of a passenger.

According to an embodiment of the present disclosure, when a pupil part 1711 of a face region 1710 of a passenger increases from an original size to a size 1712 equal to or greater than a threshold value, the processor can detect this and recognize that the passenger has entered a wake-up state from a drowsy state.

Upon recognizing that the passenger has entered a wake-up state from a drowsy state, the processor can acquire a direction of a line of sight of the passenger using at least one camera included in the vehicle. Then, the processor can activate an overhead display 1712 in a deactivated state positioned in the direction of the line of sight and display driving information 1712A thereon.

Figure 18:
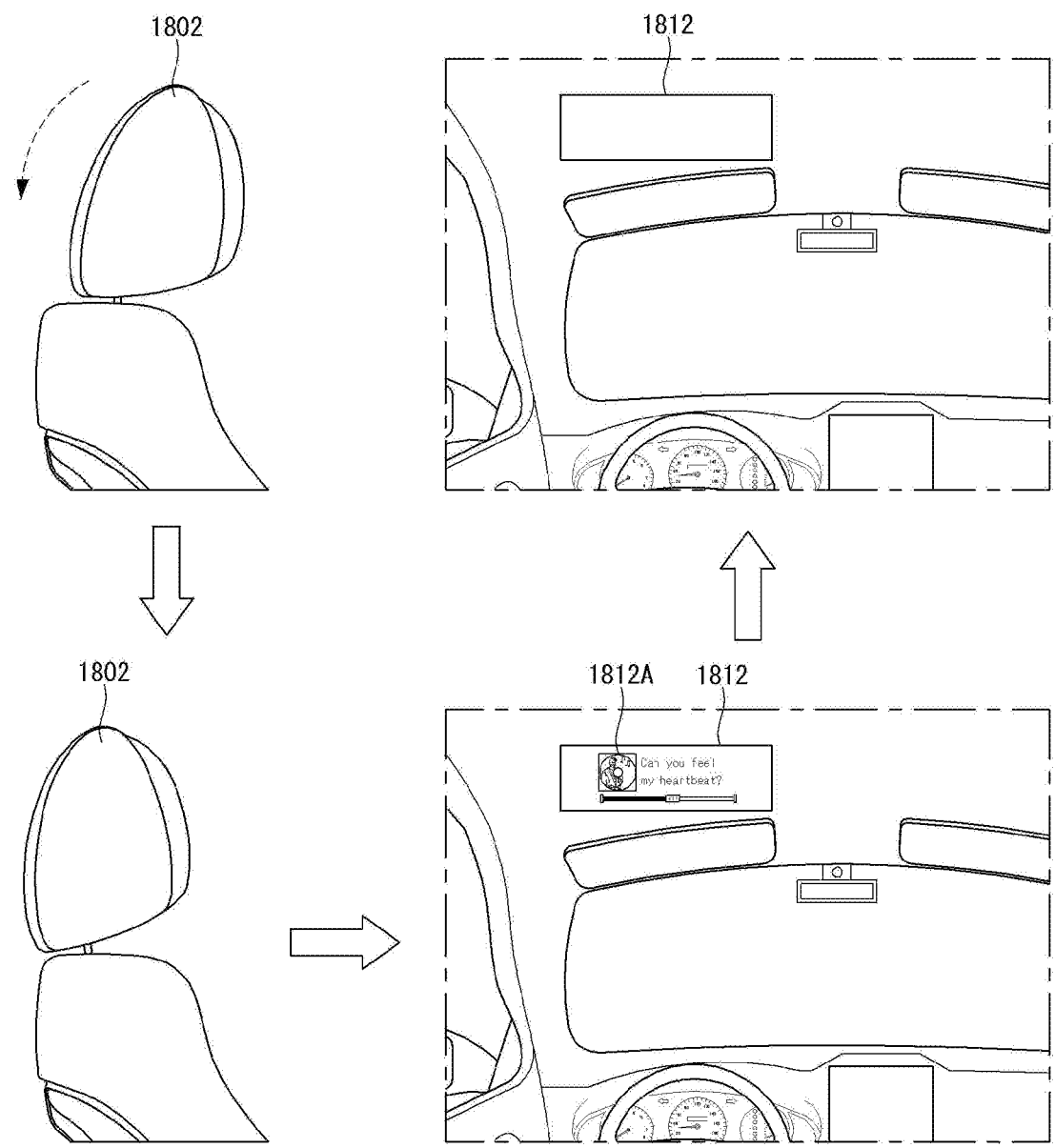
FIG. 18 illustrates an example of starting a display in a drowsy state of a passenger.

FIG. 18 illustrates an example of starting a display in a drowsy state of a passenger.

As illustrated in FIG. 18, according to an embodiment of the present disclosure, when the head 1802 of a seat tilts backward, the processor can detect tilting and recognize that a passenger has entered a drowsy state from a wake-up state.

Upon recognizing that the passenger has entered a drowsy state from a wake-up state, the processor can stop display of driving information 1812A displayed on an overhead display 1812 in an activated state and deactivate the overhead display 1812.

Figure 19:
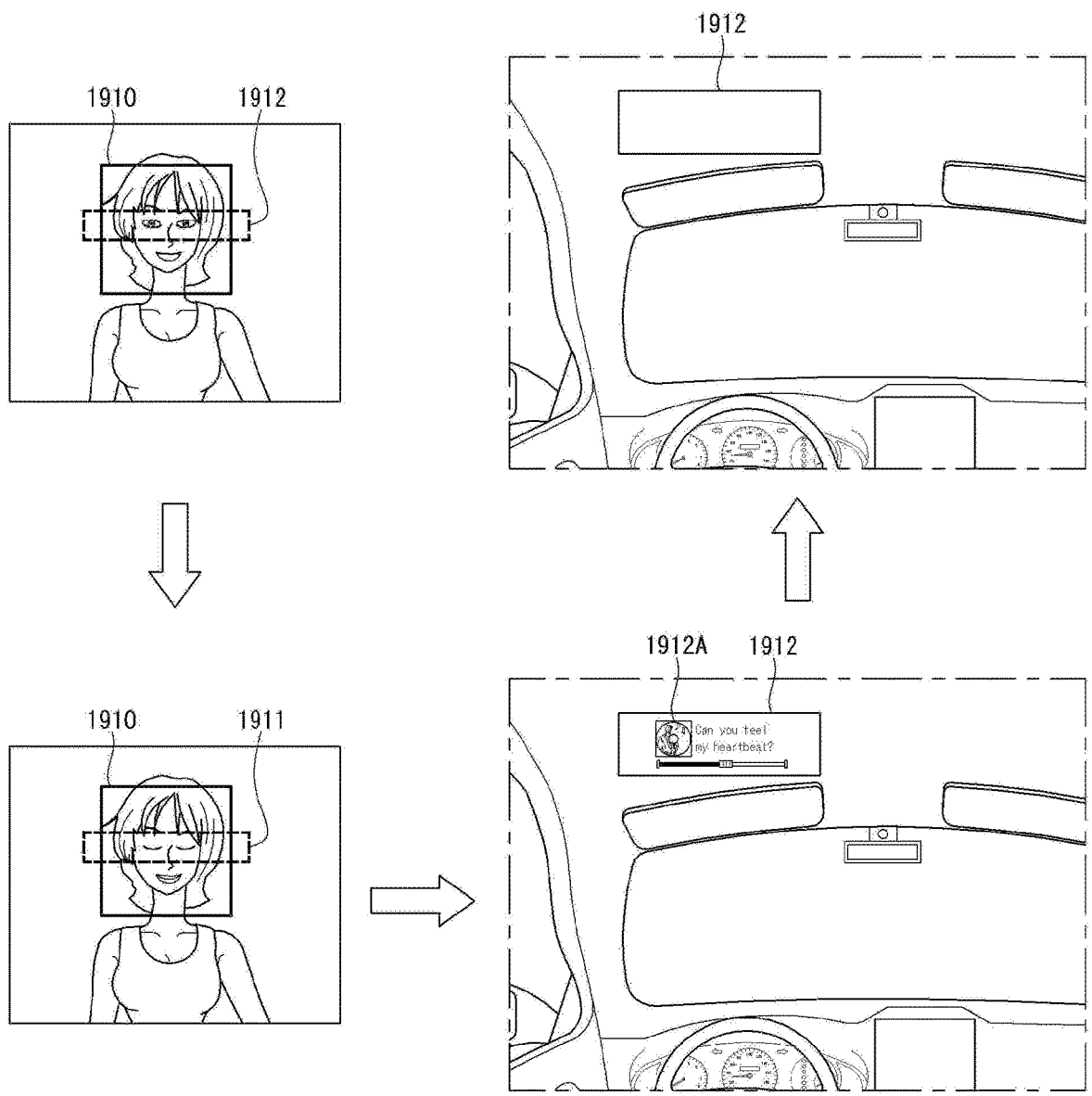
FIG. 19 illustrates another example of starting a display in a drowsy state of a passenger.

FIG. 19 illustrates another example of starting a display in a drowsy state of a passenger.

As illustrated in FIG. 19, according to an embodiment of the present disclosure, when a pupil part 1911 of a face region 1910 of a passenger decreases from an original size to a size 1912 less than a threshold value, the processor can detect this and recognize that the passenger has entered a drowsy state from a wake-up state.

Upon recognizing that the passenger has entered a drowsy state from a wake-up state, the processor can stop display of driving information 1912A displayed on an overhead display 1912 in an activated state and deactivate the overhead display 1912.

Embodiment 1: a method for controlling a vehicle includes: acquiring a direction of a line of sight of a passenger of the vehicle through at least one sensor included in the vehicle; and displaying driving information of the vehicle through at least one of a plurality of displays included in the vehicle on the basis of the direction of the line of sight of the passenger.

Embodiment 2: in embodiment 1, the method further includes acquiring state information of the passenger of the vehicle through the at least one sensor, wherein the displaying of the driving information of the vehicle includes displaying the driving information on the basis of the state information of the passenger.

Embodiment 3: in embodiment 2, the displaying of the driving information of the vehicle includes displaying the driving information when a state of the passenger is determined to be a wake-up state.

Embodiment 4: in embodiment 3, the displaying of the driving information of the vehicle includes stopping display of the driving information when a state of the passenger has changed from a wake-up state to a drowsy state.

Embodiment 5: in embodiment 4, the state information of the passenger is determined on the basis of a pressure value applied to a head part of a seat on which the passenger sits.

Embodiment 6: in embodiment 5, the state information of the passenger is determined to be the drowsy state when a pressure applied to the head part of the seat on which the passenger sits is detected as a value equal to or greater than a threshold value and determined to be the wake-up state when the pressure applied to the head part of the seat on which the passenger sits is detected as a value less than the threshold value.

Embodiment 7: in embodiment 4, the state information of the passenger is determined on the basis of change in a face region of the passenger photographed by a camera sensor which photographs the passenger from among the at least one sensor.

Embodiment 8: in embodiment 7, the state information of the passenger is determined to be the drowsy state when the size of a pupil included in the face region of the passenger decreases to below a predetermined size and determined to be the wake-up state when the size of the pupil increases to above the predetermined size.

Embodiment 9: in embodiment 1, the displaying of the driving information of the vehicle includes selecting at least one display corresponding to the direction of the line of sight of the passenger and displaying the driving information through the at least one display.

Embodiment 10: in embodiment 9, the plurality of displays includes one or more of a head-up display, an overhead display, a sun visor display, a window display, a sunroof display, a display provided on the backside of a front seat, and a ceiling display.

Embodiment 11: an intelligent device for controlling a vehicle includes: a plurality of displays; at least one sensor; a processor; and a memory including commands executable by the processor, wherein the commands cause the processor to acquire a direction of a line of sight of a passenger of the vehicle through the at least one sensor and to display driving information of the vehicle through at least one of the plurality of displays on the basis of the direction of the line of sight of the passenger.

Embodiment 12: in embodiment 11, the processor acquires state information of the passenger of the vehicle through the at least one sensor and displays the driving information on the basis of the state information of the passenger.

Embodiment 13: in embodiment 12, the processor displays the driving information when a state of the passenger is determined to be a wake-up state.

Embodiment 14: in embodiment 13, the processor stops display of the driving information when a state of the passenger has changed from a wake-up state to a drowsy state.

Embodiment 15: in embodiment 14, the state information of the passenger is determined on the basis of a pressure value applied to a head part of a seat on which the passenger sits.

Embodiment 16: in embodiment 15, the state information of the passenger is determined to be the drowsy state when a pressure applied to the head part of the seat on which the passenger sits is detected as a value equal to or greater than a threshold value and determined to be the wake-up state when the pressure applied to the head part of the seat on which the passenger sits is detected as a value less than the threshold value.

Embodiment 17: in embodiment 14, the state information of the passenger is determined on the basis of change in a face region of the passenger photographed by a camera sensor which photographs the passenger from among the at least one sensor.

Embodiment 18: in embodiment 17, the state information of the passenger is determined to be the drowsy state when the size of a pupil included in the face region of the passenger decreases to below a predetermined size and determined to be the wake-up state when the size of the pupil increases to above the predetermined size.

Embodiment 19: in embodiment 11, the processor selects at least one display corresponding to the direction of the line of sight of the passenger and displays the driving information through the at least one display.

Embodiment 20: in embodiment 19, the plurality of displays includes one or more of a head-up display, an overhead display, a sun visor display, a window display, a sunroof display, a display provided on the backside of a front seat, and a ceiling display.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method for controlling a vehicle, comprising:
causing the vehicle to enter an autonomous driving mode;
acquiring a change in a direction of a line of sight of a passenger in the vehicle through at least one sensor located in the vehicle;
deactivating, based on the acquired change in the direction of the line of sight, a first display among a plurality of displays, the first display corresponding to the direction of the line of sight;
activating, based on the acquired change in the direction of the line of sight, a second display among the plurality of displays, the second display corresponding to the changed direction of the line of sight;
displaying driving information of the vehicle on the second display; and
acquiring state information of the passenger of the vehicle through the at least one sensor,
wherein the displayed driving information of the vehicle corresponds to the state information of the passenger,
wherein the display of the driving information is based on a determination that the state information is a wake-up state.

2. The method of claim 1, wherein the display the driving information is stopped based on the state information being changed from the wake-up state to a drowsy state.

3. The method of claim 2, wherein the state information of the passenger is determined based on a value of pressure applied to a head part of a seat on which the passenger sits.

4. The method of claim 3, wherein the state information of the passenger is determined to be the drowsy state based on the value of the pressure applied to the head part of the seat on which the passenger sits being equal to or greater than a threshold value, and
wherein the state information of the passenger is determined to be the wake-up state based on the value of the pressure applied to the head part of the seat on which the passenger sits being less than the threshold value.

5. The method of claim 2, wherein the state information of the passenger is determined based on a change in a face region of the passenger photographed by a camera sensor.

6. The method of claim 5, wherein the state information of the passenger is determined to be the drowsy state based on a detected size of a pupil included in the face region of the passenger being less than a predetermined size, and
wherein the state information of the passenger is determined to be the wake-up state based on the detected size of the pupil being greater than the predetermined size.

7. The method of claim 1, wherein the plurality of displays comprise one or more of a head-up display, an overhead display, a sun visor display, a window display, a sunroof display, a display located on a backside of a front seat, and a ceiling display.

8. The method of claim 1, wherein the first display is deactivated before the direction of the line of sight changes, and
wherein the second display is activated after the direction of the line of sight changes.

9. An intelligent computing device for controlling a vehicle, comprising:
a plurality of displays;
at least one sensor;
a processor; and
a memory configured to store commands executable by the processor,
wherein the processor is configured to:
cause the vehicle to enter an autonomous driving mode;
acquire a change in a direction of a line of sight of a passenger in the vehicle through the at least one sensor located in the vehicle;
deactivate, based on the acquired change in the direction of the line of sight, a first display among the plurality of displays, the first display corresponding to the direction of the line of sight;
activate, based on the acquired change in the direction of the line of sight, a second display among the plurality of displays, the second display corresponding to the changed direction of the line of sight;
display driving information of the vehicle on the second display; and
acquire state information of the passenger of the vehicle through the at least one sensor; and
wherein the displayed driving information corresponds to the state information of the passenger,
wherein the display of the driving information is based on a determination that the state information is a wake-up state.

10. The intelligent computing device of claim 9, wherein the processor is further configured to stop displaying of the driving information based on the state information being changed from the wake-up state to a drowsy state.

11. The intelligent computing device of claim 10, wherein the state information of the passenger is determined based on a value of pressure applied to a head part of a seat on which the passenger sits.

12. The intelligent computing device of claim 11, wherein the state information of the passenger is determined to be the drowsy state based on the value of the pressure applied to the head part of the seat on which the passenger sits being equal to or greater than a threshold value, and
wherein the state information of the passenger is determined to be the wake-up state based on the value of the pressure applied to the head part of the seat on which the passenger sits being less than the threshold value.

13. The intelligent computing device of claim 10, wherein the state information of the passenger is determined based on change in a face region of the passenger photographed by a camera sensor.

14. The intelligent computing device of claim 13, wherein the state information of the passenger is determined to be the drowsy state based on a detected size of a pupil included in the face region of the passenger being less than a predetermined size, and
wherein the state information of the passenger is determined to be the wake-up state based on the detected size of the pupil being greater than the predetermined size.

15. The intelligent computing device of claim 9, wherein the plurality of displays comprise one or more of a head-up display, an overhead display, a sun visor display, a window display, a sunroof display, a display located on a backside of a front seat, and a ceiling display.

16. The intelligent computing device of claim 9, wherein the first display is deactivated before the direction of the line of sight changes, and wherein the second display is activated after the direction of the line of sight changes.

* * * * *